Dec. 27, 1960   W. C. JOHNSON   2,966,218
LAWN IMPLEMENT
Filed May 2, 1957
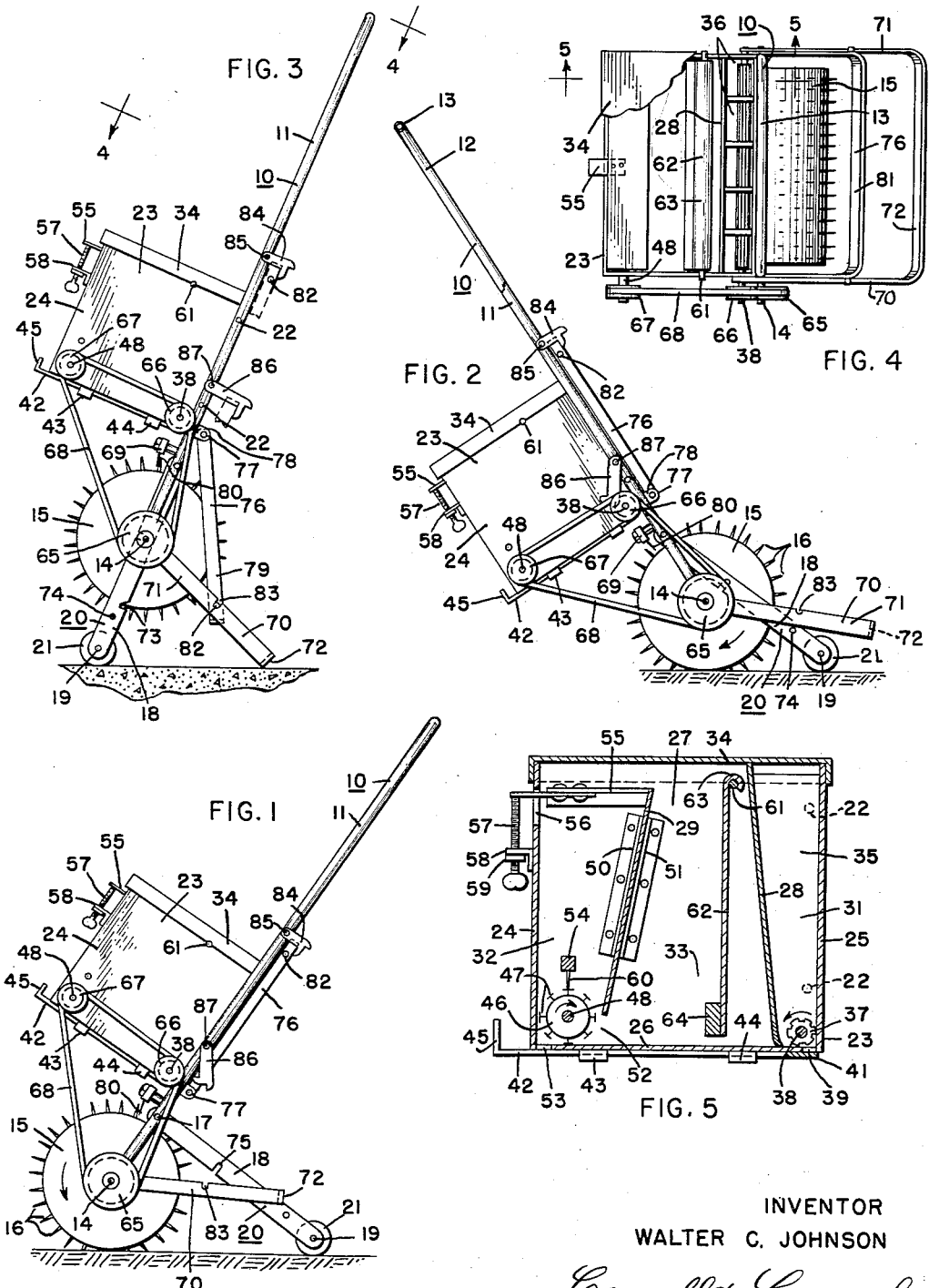
INVENTOR
WALTER C. JOHNSON
Caswell & Lagaard
ATTORNEYS United States Patent Office 2,966,218
Patented Dec. 27, 1960

2,966,218
LAWN IMPLEMENT
Walter C. Johnson, 3941 24th Ave. S.,
Minneapolis 5, Minn.
Filed May 2, 1957, Ser. No. 656,688
1 Claim. (Cl. 172—172)

The herein disclosed invention relates to lawn implements and has for an object to provide a single implement by means of which a lawn may be kept in proper condition.

Another object of the invention resides in providing a lawn implement which may be used for aerating the ground, forming seed retaining pockets in the ground, for seeding, for fertilizing, for covering the seeded lawn with soil and for rolling the ground to bury the seeds and to flatten out the lawn.

A still further object of the invention resides in providing a lawn implement which may be wheeled about the lawn in either direction, which may be wheeled about on a sidewalk with the drum out of contact therewith or which may be supported by itself in upright position.

Another object of the invention resides in providing a lawn implement having a U-shaped main frame provided with a toothed ground engaging drum mounted for rotation therein and a roller frame pivoted to the main frame and carrying a roller, said roller frame being movable from a position in alignment with the longitudinal frame members of said main frame and in which position the roller projects outwardly beyond the drum and to an angular position relative to the longitudinal frame members of said main frame and in which the roller engages the ground and follows the drum and in further providing a keeper for engaging the roller frame and maintaining the roller in ground engaging position.

A still further object of the invention resides in utilizing said keeper as a stand operating in conjunction with said roller to support the implement by itself in upright position, and in further providing a brace acting between said main frame and keeper and holding said keeper in position.

Other objects of the invention reside in the novel combination and arrangement of parts and in the details of construction hereinafter illustrated and/or described.

In the drawings:

Fig. 1 is a side elevational view of a lawn implement with an embodiment of the invention incorporated in the same and showing the parts arranged for aerating and/or seeding.

Fig. 2 is a view similar to Fig. 1 and showing the invention with the parts arranged for the deposit of soil on the ground.

Fig. 3 is a view similar to Fig. 1 and showing the implement arranged for self support.

Fig. 4 is a plan sectional view of the structure shown in Fig. 3 and taken on line 4—4 of Fig. 3.

Fig. 5 is an elevational-sectional view of the seed and soil receptacle of the implement taken on line 5—5 of Fig. 4 and drawn to a greater scale.

The invention comprises a U-shaped frame 10 having longitudinal frame members 11 and 12 with a handle 13 extending across the upper ends of the same and formed integral with said longitudinal frame members. The lower ends of said frame members are drilled transversely to form bearings for a shaft 14. This shaft has mounted on it between the longitudinal frame members 11 and 12 a drum 15 having teeth 16 extending outwardly therefrom. Pivoted to the frame 10 is a roller frame 20 which comprises two arms 18. These arms are pivoted at their upper ends to the two members 11 and 12 of frame 10 by means of rivets 17 and are drilled transversely at their lower ends to form bearings for a shaft 19. Shaft 19 has mounted on it a roller 21 which may be constructed of wood, rubber or some similar material. The drum 15 is adapted to be rolled over the ground as the device is manipulated and the roller 21 also engages the ground, the arms 18 being adapted to swing on said rivets to bring said roller into ground engaging position.

Mounted on the frame 10 and secured thereto by means of rivets 22 is a receptacle 23. The receptacle has a front wall 24, a rear wall 25, a bottom 26, and end walls 27. Rivets 22 extend through the frame members 11 and 12 and said end walls and hold the receptacle attached to frame 10. Within the interior of the receptacle 23 is provided a transversely extending fixed partition 28 and an adjustable partition 29 which divide the interior of the receptacle into a seed storage compartment 31 adjacent the wall 28, a soil feeding compartment 32 adjacent the wall 24, and a soil storage compartment 33 between the compartments 31 and 32. The receptacle 23 is open at the top and may be closed by means of a flanged cover 34 which fits over the various walls of the same and which may be held in position in any desired manner.

Extending between the partition 28 and the wall 25 of receptacle 23 are a number of dividers 35 which divide the compartment 31 into channels 36 leading down to the bottom of the compartment. At the lowermost portion of the compartment 31 is located a corrugated feed roller 37 which is mounted on a shaft 38. The feed roller 37 extends through the various compartments and is located in close proximity to the bottom 26. The end walls 27 of the receptacle 23 are drilled to form bearings for the shaft 38. The bottom 26 is formed with a transverse slot 39 which may be closed by means of a blade 41 attached to a shift rod 42. This rod is guided for reciprocating movement in guides 43 and 44 attached to the bottom 26. The outer end of the shift rod 42 has a handle 45 formed thereon and by means of which the blade 41 may be reciprocated in a back to front direction to vary the opening of the slot 39.

In the compartment 32 is mounted another feed roller 46 which has teeth 47 attached to the same and projecting outwardly therefrom. This roller travels in close proximity to the bottom 26 of the receptacle 23 and is mounted on a shaft 48. The end walls 27 of said receptacle are drilled to form bearings for the shaft 48. The adjustable partition 29 is mounted for vertical sliding movement between pairs of angle guides 50 and 51 secured to the end walls 27. By means of this construction, a space 52 is formed between the lower end of said partition and the bottom 26 in which soil placed in the compartment 33 may enter the compartment 32. A discharge slot 53 adjacent the wall 24 serves to discharge from the receptacle the soil fed by the feed roller 46. Mounted above the feed roller 46 is a bar 54 having teeth 60 thereon meshing with the teeth 47 on the roller 46. These teeth serve to clean the roller 46 and prevent the filling up of the spaces between the teeth thereon with the soil fed. The bar 54 is attached to the end walls 27 of receptacle 23.

For adjusting the height of the space 52, a bracket 55 is attached to the upper end of the partition 29. This bracket extends through a slot 56 in the front wall 24 of receptacle 23. A screw 57 screwed into a lug 58 attached to the front wall 24 engages the bracket 55 and holds the partition 29 in adjusted position. Mounted on the screw 57 is a lock nut 59 by means of which the screw may be held from rotation. The partition 29 fits loosely within the guides 50 and 51 so that the same is caused to rest on the screw 57 by gravity.

Extending across the end walls 27 near the upper end of the same and adjacent the partition 28 is a rod 61. This rod supports a swinging plate 62. Plate 62 has a U-shaped upper end 63 which hooks over the rod 61 and forms a bearing for supporting the said plate for swinging movement and also permits of readily removing the plate when desired. The lower end of the plate 62 has attached to it a weight 64.

The end of the shaft 14 has mounted on it a sheave 65. Similarly, the shafts 38 and 48 have mounted on them sheaves 66 and 67. A V-belt 68 passes about these sheaves and drives the feed rollers 37 and 46 through the movement of the drum 15 over the ground.

A comb 69 is attached to the frame 10 above the drum 15. This comb has teeth 80 which mesh with the teeth 16 of drum 15 and keep the same clean.

In operation the compartment 31 is filled with seeds and the slot 39 closed by means of the blade 41. Similarly, the compartment 33 is filled with soil in a dried state and with which may be mixed a certain amount of fertilizer. Partition 29 is also lowered until the space 52 is closed. The frame 20 is then shifted to the position shown in Fig. 1 and so held by means of a keeper 70. This keeper is U-shaped in form and has two spaced legs 71 with a bar 72 extending between the same. This keeper straddles the arms 18 of frame 20. The legs 71 are drilled to form bearings which receive the shaft 14 and support the said keeper for swinging movement. The two arms 18 are formed with notches 73 which receive the bar 72 and hold the arms 18 from movement. If the blade 41 is now moved forwardly to open the slot 39, seeds will be discharged from the compartment 31 and deposited on the ground rearwardly of the drum 15 as the same travels over the ground. The indentations in the ground made by the teeth 16 will receive some of the seeds and the roller 21 in passing over the ground will force other seeds into the indentations and partially cover the planted seeds. After the ground has been covered, using the implement with the parts thereof arranged as shown in Fig. 1 and seed deposited over the lawn, the blade 41 is caused to close the slot 39 and the parts are then rearranged as shown in Fig. 2. The bar 72 of keeper 70 is now disengaged from the notches 73 and the frame 10 swung forwardly as shown in Fig. 2. In such position the legs 71 of said keeper rest upon pins 74 attached to the arms 18. Roller 21, when the parts are so disposed, lies closer to the drum 15 and the receptacle 23 becomes tilted as shown in said figure. The partition 29 may now be raised and as the roller 46 rotates when the machine is moved over the ground, the soil in the compartment 33 is discharged into the compartment 32 and said roller discharges the same through the slot 53. The soil so discharged is deposited upon the ground and further covers the seeds formerly deposited by the feed roller 37. If desired, fertilizer can be mixed with the soil or the fertilizer can be coated on the seeds or mixed with the seeds prior to depositing the same on the lawn. If desired, the implement may be drawn by handle 13 and travels in the same direction as when used for seeding. Or, if desired, the implement may be pushed and operated in the opposite direction.

When it is desired to support the entire device with the drum 15 out of engagement with the supporting surface, the frame 20 is swung to the position shown in Fig. 3. The shaft 14 is received in notches 75 formed in arms 18 and the arms then lie in alignment with the longitudinal frame members 11 and 12 of frame 10. Roller 21 is now beneath the drum 15 and supports the entire device in raised position. The keeper 70 in this case is used as a prop and the bar 72 thereof caused to engage the supporting surface. To hold the said keeper in such position, a U-shaped brace 76 is employed which is formed with arms 79 and a connecting portion 81 therebetween. These arms are pivoted by means of rivets 77 to lugs 78 attached to the longitudinal frame members 11 and 12 of frame 10. The brace 76 is disposed within the confines of the legs 71 of keeper 70 and have pins 82 secured to the same and which are adapted to enter notches 83 in said legs. When so engaged, the brace 76 restrains upward movement of the keeper 70 and the device becomes self-supported as shown.

When the device is used as illustrated in Fig. 1 for seeding, the brace 76 is swung forwardly and maintained in such position by means of a latch 84 pivoted to the leg 11 of frame 10 by means of a pintle 85.

When it is desired to wheel the device about on a sidewalk or other hard surface, the frame 20 is arranged as shown in Fig. 3, but the brace 76 is moved upwardly and latched in place by means of the latch 84 as shown in Figs. 1 and 2, and also the keeper 70 is raised upwardly and brought into engagement with the brace 76. A latch 86, similar to the latch 84, is pivoted to the frame member 11 by means of pintle 87. This latch engages the bar 72 of keeper 70 and holds the same in the position shown in dotted lines in Fig. 3. The entire device may now be wheeled about on the roller 21, and when it is desired to rest the same the keeper 70 is dropped and also the brace 76 which, as previously stated, are brought into engagement as shown in Fig. 3.

In operation, as the drum 15 travels over the ground, the shafts 38 and 48 are rotated. When the device is being pushed, while the parts are in position as shown in Fig. 1, the feed roller 37 travels in the direction of the arrow shown in Fig. 5 and the seeds are drawn through the various channels 36 by the grooves in said roller and dropped through the slot 39 upon the ground. Since the partition 29 in this case is lowered, no soil enters the compartment 32 and the roller 46 merely travels freely without discharging any soil. When the parts are rearranged as shown in Fig. 2 and the same pushed by handle 13, the drum 15 travels in the opposite direction and feed roller 46 now travels in the direction shown by the arrow in Fig. 5. The teeth 47 on said roller now pick up the soil through the space 52 and move it along the bottom 26 to the slot 52 and from which it is discharged. When, however, the implement is drawn the roller 46 travels in the opposite direction and soil is picked up by the same and carried over the top of the same and finally discharged through slot 53. The position of the partition 29 determines the amount of soil fed by the roller 46. The plate 62 serves to urge the soil toward the partition 29 and to cause the same to pass through the space 52 and into compartment 32 when the case 23 is tilted as shown in Fig. 2.

The advantages of the invention are manifest. The device can be used for aerating the ground in which the grass of the lawn grows by merely closing the space 52 and the slot 39. In such case, drum 15 is merely wheeled over the ground until a sufficient number of holes have been punched through the surface of the ground. While the implement is being so used, the keeper 70 may be held out of engagement with the arms 18. Roller 21 then merely rolls freely over the surface without exerting pressure on the same. The implement may also be used for seeding and subsequently for applying soil and/or fertilizer to the surface of the lawn. Where fertilizer only is to be applied to the lawn, the same is best applied by placing the same in the compartment 31 and using the feed roller 37 for the purpose. The implement may be conveniently wheeled about over the ground and when desired to be transported, the drum may be raised above the ground and the roller used for supporting the implement. When it is desired to maintain the implement with the drum elevated and in stationary position, the keeper and brace together with the roller form a stand for supporting the implement and holding the drum above the level of the ground. When the handle of the device is tilted in one direction the implement may be used for seeding and when tilted in the opposite direction the implement may be used for applying soil to the ground.

Changes in the specific form of the invention, as herein described, may be made within the scope of what is claimed without departing from the spirit of the invention.

Having described the invention, what is claimed as new and desired to be protected by Letters Patent is:

A lawn implement comprising a main frame having longitudinal frame members extending in an up and down direction, handle means at the upper ends of said frame members, a toothed ground engaging drum rotatably mounted at the lower ends of said frame members, a roller frame comprising arms pivoted to said main frame members at localities above the axis of rotation of said drum and adapted to swing into positions in alignment with said elongated frame members, means for limiting the movement of said arms when reaching such positions, a roller rotatably mounted in said roller frame at the outer ends of said arms, said arms being of sufficient length to bring said roller outwardly of said drum when said arms are in alignment with said frame members, a keeper pivoted to said main frame and having a part adapted to engage the ground when the arms of said roller frame are in alignment with the longitudinal frame members of said main frame, and a brace acting between said main frame and keeper and holding said keeper in engagement with the ground.

References Cited in the file of this patent

UNITED STATES PATENTS

| | | |
|---|---|---|
| 1,407,133 | Durany | Feb. 21, 1922 |
| 1,802,711 | Fitts | Apr. 28, 1931 |
| 1,914,915 | Handler | June 20, 1933 |
| 1,955,937 | Allen | Apr. 24, 1934 |
| 2,111,478 | McGuire | Mar. 15, 1938 |
| 2,260,110 | Blohm | Oct. 21, 1941 |
| 2,601,591 | Colombo | June 24, 1952 |